United States Patent [19]
Norkaitis

[11] 3,793,694
[45] Feb. 26, 1974

[54] APPARATUS FOR USE IN REBUILDING ELECTROMAGNETIC UNITS

[76] Inventor: Anthony B. Norkaitis, 906 Linden Ct., Western Springs, Ill. 60558

[22] Filed: June 2, 1972

[21] Appl. No.: 259,220

[52] U.S. Cl. .............................................. 29/205 R
[51] Int. Cl. .......................................... H02k 15/06
[58] Field of Search ......... 29/205 D, 205 E, 205 R, 29/203 R, 203 P

[56] References Cited
UNITED STATES PATENTS
2,873,514   2/1959   Mills ................................. 29/205 E
3,137,931   6/1964   Moore ............................... 29/205 R Primary Examiner—Thomas H. Eager

[57] ABSTRACT

An apparatus for rebuilding electrical units by inserting coils of wire into the units in a desired position, such as into stators of motors or generators. The apparatus includes means for positioning the part to be rebuilt, means for indexing it to a succession of different positions, means for guiding a coiled wire into the part at each of the positions, means for storing the coils of wire prior to insertion thereof, and means for repositioning the part holder after each of a first sequence of position movements is undergone. According to the invention, wire is coiled about a coil receiving mandrel, this mandrel is positioned within a part receiving mandrel, the wire is fed from the wire mandrel in coils into slots in the stator or armature, and, in the case of multi-phase motors or generators, after each slot is filled, the part is indexed by rotation to the next succeeding postion for repetition of the cycle.

11 Claims, 6 Drawing Figures

PATENTED FEB 26 1974 3,793,694

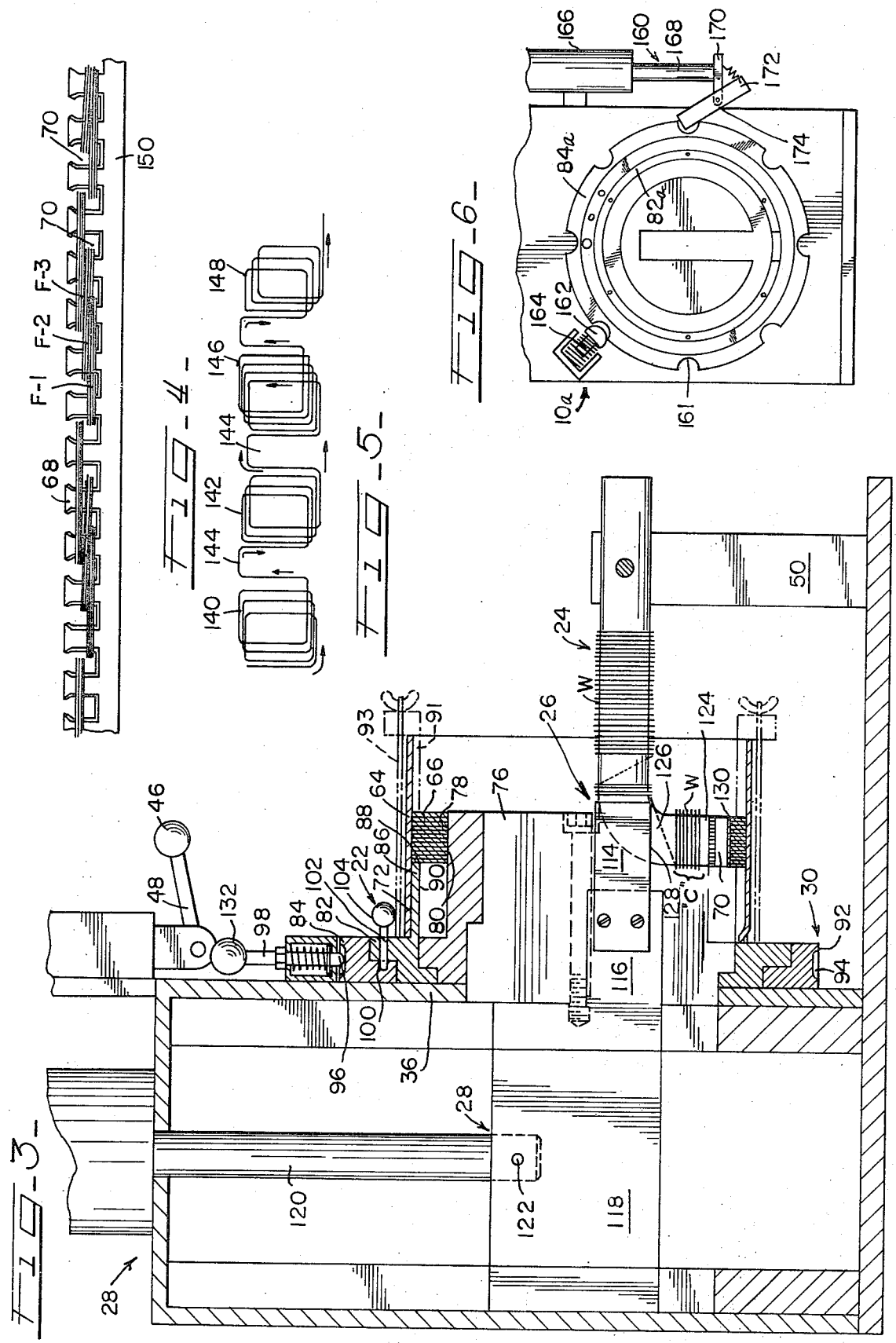

APPARATUS FOR USE IN REBUILDING ELECTROMAGNETIC UNITS

BACKGROUND OF THE INVENTION

The present invention relates generally to an apparatus for use in rebuidling electromagnetic units, such as for inserting electrical windings in a sequence of predetermined positions within the slots provided therefor in various electrical apparatuses, including the slots of electrical stators.

More particularly, the invention relates to an apparatus for receiving and positioning an electrical motor, generator, or the like in a predetermined position, and having means for receiving a mandrel containing plural coil windings, means for removing the windings from the mandrel and for placing them in position within the slots extending between stator teeth, means for successively advancing the stator to a series of positions for receiving additional windings in additional slots, to complete the winding of a first electrical phase, and means for periodically repositioning the stator so as to initiate and continue placement therein of windings forming a part of one or more electrical phases in addition to the first electrical phase.

Although the invention has utility in a number of fields and applications, the background thereof is best understood by reference to a common problem in electrical motor and generator fields, namely, the problem of rewinding the stators of alternating current generators (alternators) or the like during rebuilding. Although alternators used in truck and automotive service applications are highly reliable from a statistical standpoint, there are still large numbers of alternators which fail in use from random causes, and a large number of alternators which fail from extrinsic causes, such as fire or physical damage. Since the major portion of the electrical components of typical alternators do not undergo physical wear in the conventional sense, a major number of alternators having defective stators may be rebuilt, merely by rewinding the stator with new wire, into units having life expectancies substantially equal to those of new or original equipment units.

However, as is the case with many other articles of manufacture which include a plurality of diverse parts, repairing or rewinding an alternator has in the past called for largely or almost exclusively manual rewinding, or, in the alternative, rewinding thereof on machines which are the same as or similar to those used in the manufacture of the stators in the first instance. By way of example, a winding apparatus of the type in question is commercially available at present only on a special order basis requiring extremely long delivery time and costing no less than $35,000 to $45,000, with the so-called change parts required to wind different forms of stators costing approximately $5,000 to $10,000 or more per set.

Accordingly, it has not heretofore proven economically feasible for small or moderate sized repair or rebuilding shops to obtain such machines. On the other hand, winding a typical alternator stator by hand may require anywhere from 40 to 50 minutes to an hour or more, even using relatively skilled labor. The foregoing situation is true in spite of the fact that the physical process of making the turns or windings which form the coils used with the teeth in a stator to form the pole piece may be done in a simple and straightforward manner.

With modern alternators, which use a relatively heavy gauge of wire, manually inserting each multi-turn coil in the appropriate slots has proved to be a tedious and time-consuming operation. Accordingly, it has generally been the custom in the trade for relatively few rebuilders to furnish rebuilt alternator stators, and for replacement part sales organizations to purchase and sell stators which are either new or rebuilt at a large factory or the like.

The foregoing situation is particularly economically disadvantageous when it is considered that the current-carrying portion of the stator consists of coated copper wire, the cost of which is not significantly higher than the cost of copper itself, and the fact that stator pole piece laminations have an extremely long life expectancy if not subjected to physical abuse. Consequently, the cost of rebuilt or rewound electrical stators of the type in question reflects more than anything else the cost of the labor required to perform the rewinding operations referred to above.

Accordingly, there has been a definite need in the electrical apparatus rebuilding field for an apparatus or machine capable of eliminating the tedious hand work associated with stator rebuilding and which would be available at a small fraction of the cost required for heretofore known equipment intended for the same general known purpose.

In view of the foregoing, it is an object of the present invention to provide a simple and low cost apparatus for rapidly and accurately positioning coils of wire in a desired position of use within a pole piece forming a part of an electrical apparatus.

Another object is to provide an improved apparatus for inserting preformed wire coils in the pole pieces of stators or other electromagnetic elements.

A further object is to provide an apparatus for such purpose which is simple to operate and economical to manufacture.

A still further object is to provide an apparatus for winding alternator stators and having means for receiving plural coils of electrically conductive wire, means for feeding these coils in groups to a predetermined position of approximate registry with the pole piece with which the coil groups are to be associated in use and means for stripping or removing the coils from the receiving means and inserting them within the slots between the teeth of the pole piece forming a part of the stator.

Still another object is to provide an apparatus adapted to receive an electrical stator or the like in a predetermined position, to retain it in such position until one or more pairs of slots have received the electrical windings desired to be inserted therein, and means for rotating the stator to a series of subsequent positions for reception of other coils, whereby the entire stator may be rewound before being removed from the apparatus.

A still further object is to provide an apparatus of the type referred to just above, and which further includes means for repositioning the stator in one or more predetermined subsequent positions for receiving additional windings forming a part of additional electrical phases which are physically and electrically spaced apart from the windings forming a part of additional electrical phases which are physically and electrically spaced apart from the windings forming a part of the first electrical phase.

Another object is to provide an apparatus of the type referred to generally herein and which is adapted for ready reception of so-called change parts used in rewinding different makes or styles of alternators.

A further object is to provide an apparatus which is readily adaptable to rewinding or rebuilding electrical generators, motors, or the like having different physical sizes and including different numbers of phases, and different numbers of coils within each of the windings, as well as different numbers of turns within each coil.

Another object is to provide an apparatus which includes a frame assembly, a part mandrel for slidingly engaging one surface of the part to be rewound for supporting such part, means for fixedly engaging another surface of the part so as to permit rotation thereof about the axis of the part mandrel, an axially extending opening formed in the part mandrel and communicating with an outer radial edge portion thereof, a reciprocable coil removal assembly including a pair of spaced apart fingers adapted to engage parallel legs of a coil disposed within the opening on a coil mandrel, and means for reciprocating said fingers radially of the part mandrel and within the opening under the control of an operator, to strip the coils from the coil mandrel and insert them in slots formed in the stator or other part.

Another object is to provide such an apparatus which further includes a coil mandrel having an axially extending coil storage portion and a turned end portion extending radially from the axial portion and adapted to be positioned within the opening in the part mandrel, whereby wire coils may be fed axially into the opening and removed radially from the coil mandrel and by the reciprocable fingers pushed through the part mandrel opening and into the part slots.

The foregoing and other objects and advantages of the invention, including various objects and advantages inherent therein, are achieved by providing an apparatus having means forming a part thereof for receiving a portion of an electrical apparatus intended to receive one or more coil windings, means for positioning a coil of wire in position of registry with a portion of the apparatus intended to receive the coil, means for removing the coil from the coil positioning means and for inserting the coil in a desired position of use within the electrical apparatus, and means for moving the apparatus receiving the windings to a series of successive positions bearing predetermined relation to the first position, whereby successive coils may be removed from the positioning means and inserted in positions spaced apart from the positions spaced apart from the position of the first coil.

The manner in which the foregoing and other inherent objects and advantages of the invention are achieved in practice will become more clearly apparent when reference is made to the following detailed description of the preferred embodiments of the invention set forth by way of example, to the claims appended hereto, and to the accompanying drawings, in which like reference numbers indicate corresponding parts throughout.

BRIEF DESCRIPTION OF THE DRAWINGS

FIG. 3 is a vertical sectional view of the apparatus shown in FIGS. 1 and 2, showing a stator locking collar in phantom lines and taken along lines 3—3 of FIG. 2;

FIG. 4 is a developed view of a stator which may be rewound using the apparatus of the invention, showing one typical form of electrical windings positioned thereon;

FIG. 5 is a perspective view, partially diagrammatic in character, showing the physical formation of the coils capable of being inserted by the apparatus of the invention into stator slots; and FIG. 6 is a front elevational view of another embodiment of the invention which includes means for automatically indexing the stator or the like to a series of successive positions by automatic means under the control of an operator.

DESCRIPTION OF THE PREFERRED EMBODIMENTS OF THE INVENTION

Figure 1:
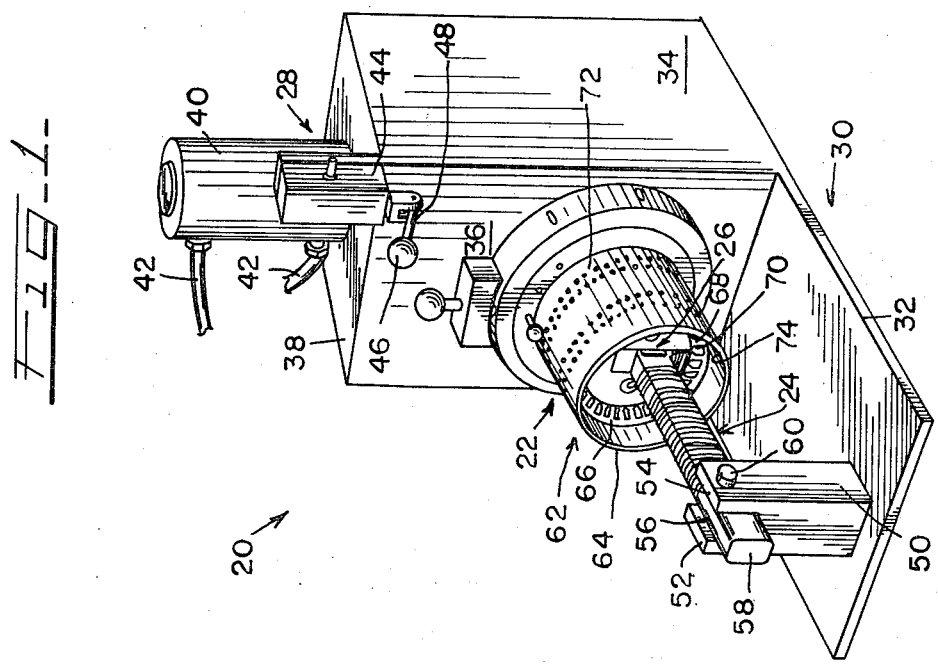
FIG. 1 is a perspective view of the apparatus of the invention and showing the same to include a wire receiving mandrel with the end portion thereof in position of use and with an alternator stator positioned over the part receiving and rotating mandrels.

Although it will be understood that the apparatus of the present invention is capable of diverse uses, an embodiment thereof will be described merely by way of example wherein the electrical apparatus being wound is the stator portion of an electrical alternator typically used in an automotive application, in which three phases of eight coils each are positioned in the alternator, in which the coils are formed on a mandrel which serves to receive them for storage and subsequent advancement, wherein means are provided for indexing the stator to predetermined starting positions for loading each of the second and third electrical phases, and wherein the movement of the fingers removing the wire and positioning it within the stator are semi-automatically controlled by the operator and are pneumatically actuated.

Although these terms are not ordinarily restricted to these meanings, as used herein, unless the contact clearly indicates otherwise, a coil is considered to consist of several turns of wire, a plurality of coils spaced about the stator and lying in slots defined between adjacent teeth of the stator comprise one winding, which also constitutes one electrical phase, with other distributed coils comprising one or more additional windings or additional electrical phases.

Each wire turn is considered to be made from four legs, with spaced apart coils being typically connected by a leg extending parallel to the direction of armature rotation. The pole piece, for purposes of illustration, will be considered to be made up of stacked laminations with radially inwardly extending teeth having inner edges of increased circumferential extent with the teeth being spaced apart by radially cut out, axially extending slots.

Referring now to the drawings in greater detail, the invention may be seen to be embodied in a unit generally designated 20 and shown to comprise a plurality of principal elements, including a part mounting and indexing assembly 22, a coil storage and feeding assembly generally designated 24, a coil stripping and positioning assembly 26, and means generally designated 28 for reciprocating the coil stripping and positioning apparatus, with the foregoing assemblies being located with respect to each other by mounting on a frame generally designated 30.

Referring now to FIG. 1, the frame 30 is shown to include a base plate 32, a pair of vertically extending side walls 34, a front wall portion 36, and a top wall 38, which is surmounted by a pneumatic double acting piston and cylinder assembly 40 including a pair of pneumatic lines 42 feeding the assembly 40. A control switch assembly 44 is shown to be operated by a knob 46 on the end of an operating lever 48, it being understood that downward movement of the knob will cause the piston (not shown) within the assembly 40 to move downwardly, and upward movement of the knob and lever 48 will cause upward movement of the piston. The control and piston and cylinder assembly being of a type well known to those skilled in the art, and such units not forming a part of the invention which is necessarily novel per se, further description thereof will be omitted. However, it will be understood that according to conventional practice, the air supply is normally fed through the lines 42 under a regulated pressure after being suitably filtered and dried.

Referring again to FIG. 1, there is also shown a vertically extending mandrel support bracket 50 having a pair of legs 52, 54 at the top thereof defining an opening therebetween in which is received the rear end portion 58 of the means 24 for storing and feeding the coils of wire which comprise a winding. A pin 60 extending through an opening (not shown) in the end 56 of the coil storing and feeding mandrel 24 combines with the support surface 56 (FIG. 3) of the bracket 50 to mount the mandrel 24 in a fixed position and to prevent undesirable axial or radial movement thereof.

As shown in FIG. 1, a part generally designated 62 to be rebuilt or repaired is shown to be in a form of an alternator stator having an exterior, perforated cylindrical metal casing containing therein a pole piece 66 having teeth 68 and slots 70 therebetween in which will be received a plurality of coils forming various windings to be included in the completed stator unit. As shown in FIG. 1, the casing 64 includes an inner margin 72 and an outer margin 74, with the inner margin 72 lying adjacent and partly surrounding the part mounting and indexing system 22 and the outer margin 74 facing the bracket 50 which mounts the coil-receiving mandrel 24.

Figure 2:
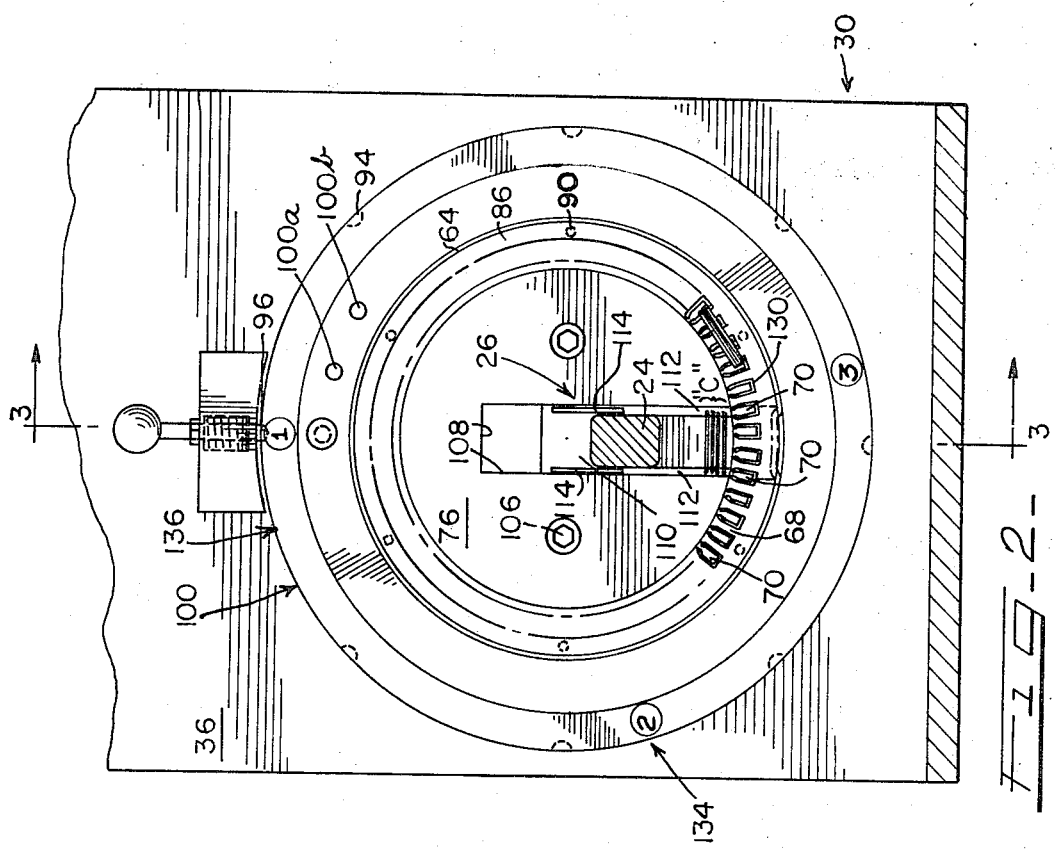
FIG. 2 is a front elevational view showing the use of the apparatus in winding an electrical stator, and showing the wire receiving mandrel in section, with one electrical phase in the process of being positioned within the stator.

Referring now to FIGS. 2 and 3, it is shown that the part mounting and indexing assembly 22 includes an inner mandrel 76 having an exterior surface 78 about which an inner surface 80 of the pole piece 66 is disposed and relative to which the pole piece 66 and casing 64 may rotate as a unit. Inasmuch as the casing 64 is fixedly attached, in a well known manner, to the pole piece 66, rotation of these parts as a unit is accomplished by moving the casing mounting ring 82 and the outer indexing ring 84 as a unit. Since the inner margin 72 of the casing 64 is closely fitted over the flange 86 on the casing mounting ring 82, with locking pins 88 on the stator being received within cut outs 90 (FIG. 2) in the flange 96, the core 66 and the casing 64 rotate together as a unit when the casing mounting ring 82 is rotated.

FIG. 3 shows in phantom lines that a stator locking collar 91 of the same size and shape as the flange 86 may be provided for positioning by thumbscrews 93 within the case 64 to further support it against movement.

Referring again to FIG. 3, it is shown that the outer surface 92 of the outer indexing ring 84 includes a series of spaced apart grooves or notches 94 adapted for reception of the nose portion 96 of a spring loaded detent unit 98. Moreover, the inner ring 82 is fixed to the outer ring 84 by reason of engagement between an opening 100 in the ring 84 and the shank 102 of the locking pin assembly 104 which, in the position of FIG. 3, locks the rings 82, 84 together for identical rotary movement.

Referring to FIG. 2, it will be shown that the indexing opening 100 has spaced apart counterpart openings 100a, 100b, permitting relative movement of the two rings 82, 84 to different index positions for reasons which will appear later. FIGS. 2 and 3 also show that the inner mandrel 76 is firmly secured by fasteners 106 to the front wall portion 36 of the frame 30, and that the various flanges provided on the mandrel 76 and the rings 82, 84 prevent axial movement of any of these parts away from the wall 36, but that they permit changing of the mandrel and the rings as a unit, if desired, by removing the socket head cap screws 106.

Referring again to FIGS. 2 and 3, it will be noted that inwardly directed surfaces 108 on the inner mandrel 76 define an opening 110 therein which receives the coil receiving mandrel 24 and that between outer surfaces of the mandrel 24 and inner surfaces 108 defining the opening 110 are a pair of reduced thickness channels 112 in which a pair of reciprocable, coil stripping fingers 114 may move. As shown, the fingers 114 are affixed to the end portion 116 of a holder 118, which in turn is moved by the piston rod 120 fastened thereto by the locking pin 122.

Accordingly, as best appears in FIG. 3, reciprocation of the rod 120 will cause vertical movement of the holder 118, the nose 116, and the fingers 114. Since the inner portion 124 of the mandrel 24 extends vertically beneath the curve section 126, any coils "C" of winding "W" lying on the portion 124 will be stripped therefrom when engaged by the lower surface 128 of the fingers 114. Inasmuch as the slots 70 in the pole piece 66 are relatively precisely aligned with the openings 112 and lie just beneath the fingers 114, further downward movement of the fingers 114 will pack a coil "C" into a pair of slots 70. As also shown in FIG. 2, insulating liners 130 are of a generally U shaped form and are commonly disposed within each of the slots to prevent short circuiting.

In the use of the apparatus, after a pair of spaced apart slots 70 have received the two legs of the coil in question, it is desired to rotate the pole piece 66 as a unit and for this purpose, the knob 132 of the detent mechanism 98 is raised and the casing 64 and the rings 82, 84 are rotated as a unit until the next notch or groove 94 moves into registry with the nose 96 of the pin 98. Thereupon, another coil "C" containing a plurality of turns of wire is moved over the curved portion 126 of the mandrel, and onto the lower portion 124 thereof. Manipulation of the knob and lever 46, 48 again reciprocates the fingers 114 downwardly to strip the coil "C" from the lower end 124 of the mandrel 24, feeding and packing the coil into the next pair of slots 70. The coils are thereafter fed and packed in the same manner until, in the case of the alternator illustrated, eight coils have been put into place.

Thereupon, the knob 132 is again lifted, and the rings 82, 84 are rotated as a unit until an indexing marker numbered "2" and designated 132 lies opposite a predetermined mark 136 on the front wall 36. Thereupon, the knob 104 is pulled outwardly and the casing mounting ring 82 is rotated relative to the outer indexing ring 84 until the pin 102 is received within the slot 100a, whereupon the rings 82, 84 are again locked together. Next, a new mandrel containing another winding is put in place with the rear end portion 58 locked in the bracket 50 by the pin 60 and with the portions 126, 124 thereof lying inside the opening 110. The process of stripping each succeeding coil of several turns of wire from the mandrel 24 and advancing the casing 64 to the next position is carried out in the same manner as described above in connection with placement of the first winding.

For the third winding, the steps are repeated, with the rings 82, 84 being again indexed to a third position "3" and with the pin 102 being received within the opening 100b.

In practice, the coils of wire are separated manually as with a screwdriver or like tool and merely pushed over the curved portion 126 of the mandrel to the position on the lower part 124 of the mandrel as shown in FIG. 3.

Referring now to FIG. 5, it is shown that after a first coil 140 is formed, that the next coil 142 placed in the stator will be physically spaced apart therefrom. For this purpose, a leg 144 lying parallel to the direction of armature rotation is merely folded to the right as shown instead of to the left, with the remainder of the coil 142 being otherwise the same. As shown, a succession of coils 146, 148 formed in this way will have current flow in the same relative direction around them, while the legs 144 permit spacing apart of the coils without difficulty.

FIG. 4 is a developed view, on an enlarged scale of a stator assembly 150 showing various electrical phases F1, F2, F3 in position in the slots 70 lying between the teeth 68. It will be understood that FIG. 4 shows the stator as lying in a flat plane for purposes of illustration; however, the types of stators which may be rebuilt using the apparatus of the invention are normally of an annular configuration. FIG. 4 shows that, in the finished form, the coils of the first phase lie closest to the outside edge of the pole piece, with the other phases lying radially inwardly thereof.

Referring now to FIG. 6, a modified form of the apparatus 10a is shown wherein means in the form of a ratchet assembly generally designated 160 is provided for automatic simultaneous advancement of the outer ring 84a and the part mounting ring 82a. As shown, the ring 84a includes relatively large, semi-circular recesses 161 adapted to be engaged by the nose portion 162 of a spring-loaded detent rod 164. The ratchet assembly 160 includes a double-acting pneumatic cylinder 166 from which extends an operating rod 168 affixed at the lower end thereof to a holder 170 for a pawl 172 which is pivotally mounted by pin 174 so as to have the nose 175 thereof urged toward the ring 84a under the force provided by the spring 176.

Although this illustration is somwehat schematic or diagrammatic in character, it will be understood that, in use, since the spring urges the nose 175 of the pawl 172 outwardly, reciprocating movement of the rod 168 will advance the ring 84a upon upward movement, while downward movement of the rod 168 will permit the nose of the pawl to ride over the outer surface of the rings 84a, thereby advancing it in one direction only, and only to the extent permitted by engagement between the grooves 161 and the nose 162 of the detent rod 164. Accordingly, if desired, the outer ring may be advanced automatically rather than manually. Since the inner ring 82a is normally fixed to the outer ring 84a, both rings are normally advanced together.

In summary, it will be appreciated that the invention provides an effective, simple, low cost rebuilding apparatus which may be easily used without the exercise of great skill, and which largely eliminates tedious hand labor and does away with the need for expensive stator or armature winders. It will thus be seen that the present invention provides a novel apparatus having numerous advantages and characteristics, including those referred to herein and other which are inherent in the invention.

A preferred embodiment and variations thereof having been described by way of example, it is anticipated that various modifications and changes to the apparatus of the invention may be made by those skilled in the art without departing from the spirit of the invention or the scope of the appended claims.

I claim:

1. An apparatus for use in rebuilding parts such as electromagnetic assemblies, said apparatus having means forming a part thereof which at least partially define the outer periphery of an area within which electrically conductive coils are to be received during positioning thereof within a part to be rebuilt, means rotatable about one axis of said part and having a portion thereof adapted to hold a portion of said part against rotation relative thereto, rotatable part indexing means having means forming a part thereof for releasable locking engagement with detent means, whereby said part indexing means may be moved through a predetermined sequence of positions, means for releasably fastening said rotatable part holding means to said rotatable indexing means, whereby said indexing means and said holding means are rotated relative to each other in another position of said fastening means, said means at least partially defining portions of said outer periphery of said coil area being axially open and also having open portions terminating closely spaced apart from and in registered relation with the portion of the part defining the outer periphery of the volume to be occupied by said coil in its inserted position, and movable means within said periphery defining means for engaging portions of said coil lying therein for removing said coil from said periphery defining means and for packing said coil into the portion of said part positioned in registry with said periphery defining means.

2. An apparatus as defined in claim 1 which further includes a coil receiving mandrel having a radially extending portion adapted for reception within said periphery-defining means, an axially directed portion adapted for storage of said coils thereon, and a smooth transition portion lying between said axial and radial portions, said apparatus also having means for positioning said radial portion in a facing relation to the part with the outer surfaces thereof registered with the outer surfaces of the part around which the coil is to be received.

3. An apparatus as defined in claim 1 wherein said means for removing and packing said coils includes a double-acting, fluid actuated cylinder for operation thereof.

4. An apparatus as defined in claim 1 wherein a portion of said periphery-defining means is in the form of a generally cylindrical mandrel having the radially outwardly directed surfaces thereof adapted for reception in a guiding relation within the inwardly directed surfaces of the part being rebuilt, the remainder of said periphery-defining means being in the form of walls extending inwardly from both radial and axial outer surfaces thereof.

5. An apparatus as defined in claim 1 wherein said part holding means is in the form of a cylindrical mandrel having an outer diameter thereof sized so as to permit reception thereover of an inwardly directed cylindrical surface of a part to be rebuilt.

6. An apparatus as defined in claim 1 wherein said means for holding said part comprises a rotatable ring having a flange portion adapted for snug engagement with a periphery of the part to be rebuilt and having another portion overlying a portion of said periphery-defining means, with portions of said periphery-defining means and said holding means being sized so as to permit relative rotation therebetween.

7. An apparatus as defined in claim 1 in which said indexing means and said holding means are coaxially disposed, with respective inner and outer surface portions thereof adapted for engagement to permit relative rotation therebetween upon release of said fastening means.

8. An apparatus as defined in claim 1 in which said periphery-defining means is in the form of a slotted cylindrical mandrel, said part holding means and said indexing means being in the form of rings disposed coaxially with each other and with said mandrel, all of said means having flanges thereon for preventing axial movement of said rings and said mandrel relative to one another and means for removing said rings and said positioning means from said apparatus as a unit.

9. An apparatus as defined in claim 1 which further includes means for automatically advancing said part indexing means to a series of consecutive positions, said means being adapted for operation following insertion of each of said coils into the portion of said part with which said coil is associated.

10. An apparatus for use in rebuilding parts which include pole pieces adapted to receive wire coils in slots forming a part thereof, said apparatus including means cooperating to define respectively the inner and outer peripheries of a volume normally occupied by a coil before insertion thereof within said pole piece, said means defining said inner periphery being in the form of a coil mandrel having an axially extending portion, a radially extending portion and a smooth transition portion lying therebetween, said mandrel being of substantially the same cross-sectional configuration throughout, coil removing and packing means associated with said means defining said outer periphery of said coil and reciprocable within the volume lying between said inner and said outer peripheries, said coil removing and packing means being adapted to engage coils confined between said peripheries and pack them within said slots, and means for aligning the part to be rebuilt into a desired position of registry with said periphery defining means.

11. An apparatus for rebuilding electrical units which include pole pieces having spaced apart, radially extending teeth separated by slots extending therebetween and having a sufficient radial and axial extent to accommodate the leg portions of electrical coils intended to be received therein, said apparatus including a coil mandrel having an axially directed portion for reception and storage of preformed coils of wire would snugly but slidably therearound, a radially directed portion, and a smooth transition portion joining said radial and axial portions, said coil mandrel having a substantially uniform cross-section sized and shaped substantially the same as the inner periphery of the area of said pole piece intended to receive said coils, means for positioning a part to receive said coils, said positioning means having wall portions spaced apart from said radially directed portion of said mandrel by a distance just sufficient to permit reception therein of said coils, and means reciprocable within said coil reception area for engaging a portion of one of said coils and stripping it radially from said mandrel and packing said coil into one of said slots.

* * * * *

UNITED STATES PATENT OFFICE
CERTIFICATE OF CORRECTION

Patent No. 3,793,694          Dated  Fbruary 26, 1974

Inventor(s)   Anthony B. Norkaitis

It is certified that error appears in the above-identified patent and that said Letters Patent are hereby corrected as shown below:

Column 4, line 45, "contact" should read -- content --.

Signed and sealed this 24th day of September 1974.

(SEAL)
Attest:

McCOY M. GIBSON JR.              C. MARSHALL DANN
Attesting Officer                Commissioner of Patents